US007995896B1

(12) United States Patent
Comer et al.

(10) Patent No.: US 7,995,896 B1
(45) Date of Patent: Aug. 9, 2011

(54) SYSTEM AND USER INTERFACE FOR A TELEVISION RECEIVER IN A TELEVISION PROGRAM DISTRIBUTION SYSTEM

(75) Inventors: Mary Lafuze Comer, Fairmount, IN (US); Thomas Edward Horlander, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 2317 days.

(21) Appl. No.: 10/129,445

(22) PCT Filed: Nov. 3, 2000

(86) PCT No.: PCT/US00/30385
§ 371 (c)(1),
(2), (4) Date: Sep. 17, 2002

(87) PCT Pub. No.: WO01/33837
PCT Pub. Date: May 10, 2001

Related U.S. Application Data

(60) Provisional application No. 60/163,609, filed on Nov. 4, 1999.

(51) Int. Cl.
*H04N 11/00* (2006.01)
*H04N 7/173* (2006.01)
(52) U.S. Cl. .......................... 386/37; 725/88
(58) Field of Classification Search .............. 386/37, 386/123; 348/554, 555; 725/104, 27, 31, 725/88, 37, 86
See application file for complete search history.

(56) References Cited

U.S. PATENT DOCUMENTS

| | | | | |
|---|---|---|---|---|
| 5,477,397 A | * | 12/1995 | Naimpally et al. | 386/123 |
| 5,485,221 A | * | 1/1996 | Banker et al. | 348/563 |
| 5,635,985 A | * | 6/1997 | Boyce et al. | 375/240.15 |
| 6,151,059 A | * | 11/2000 | Schein et al. | 725/37 |
| 6,208,388 B1 | * | 3/2001 | Farleigh | 348/705 |
| 6,262,722 B1 | * | 7/2001 | Allison et al. | 725/39 |
| 6,285,408 B1 | * | 9/2001 | Choi et al. | 348/555 |
| 6,487,722 B1 | * | 11/2002 | Okura et al. | 725/40 |
| 6,539,169 B1 | * | 3/2003 | Tsubaki et al. | 386/109 |
| 6,633,608 B1 | * | 10/2003 | Miller | 375/240.02 |
| 6,721,954 B1 | * | 4/2004 | Nickum | 725/46 |
| 6,732,367 B1 | * | 5/2004 | Ellis et al. | 725/27 |

(Continued)

FOREIGN PATENT DOCUMENTS

EP 910 214 A1 4/1999

(Continued)

*Primary Examiner* — Joseph P Hirl
*Assistant Examiner* — Hyun J Hong
(74) *Attorney, Agent, or Firm* — Robert D. Shedd; Paul P. Kiel; Guy H. Eriksen

(57) ABSTRACT

A television receiver includes a source of digital data comprising a plurality of data streams each representing one of a standard definition television signal and a high definition television signal and encoded in such a manner that it may be decoded at full resolution to produce an image substantially without visible decoding artifacts or decoded at partial resolution to produce an image possibly including visible decoding artifacts. A decoder is coupled to the digital data source, and has a maximum decoding bandwidth less than that required to simultaneously decode two high definition television signals at full decoding resolution. A controller, is coupled to the decoder, for selecting two respective ones of the data streams responsive to user input, and if both represent a high definition television signal, requesting user input for specifying one of the two respective data streams to decode at partial resolution.

34 Claims, 8 Drawing Sheets

U.S. PATENT DOCUMENTS

| | | | |
|---|---|---|---|
| 6,738,421 B1 | 5/2004 | Ueno | |
| 6,748,481 B1 * | 6/2004 | Parry et al. | 711/100 |
| 6,788,347 B1 * | 9/2004 | Kim et al. | 348/441 |
| 6,807,677 B1 * | 10/2004 | Lee | 725/58 |
| 6,854,127 B1 * | 2/2005 | Kanemitsu | 725/58 |
| 6,898,762 B2 * | 5/2005 | Ellis et al. | 715/716 |
| 6,934,964 B1 * | 8/2005 | Schaffer et al. | 725/46 |
| 2001/0016946 A1 * | 8/2001 | Inoue | 725/44 |
| 2001/0051037 A1 * | 12/2001 | Safadi et al. | 386/83 |
| 2002/0083451 A1 * | 6/2002 | Gill et al. | 725/46 |
| 2003/0014767 A1 * | 1/2003 | Stumphauzer, II | 725/131 |
| 2004/0068750 A1 * | 4/2004 | Maa | 725/113 |

FOREIGN PATENT DOCUMENTS

| | | |
|---|---|---|
| JP | HEI 5-130574 | 5/1993 |
| JP | HEI 10-248051 | 9/1998 |
| JP | 10308945 | 11/1998 |
| JP | HEI 11-24641 | 1/1999 |
| JP | HEI 11-112901 | 4/1999 |
| JP | 11275480 | 10/1999 |
| WO | 98/41011 | 9/1998 |

* cited by examiner

SELECT ONE OF THE FOLLOWING OPTIONS:

☐ RECORD HIGHEST RESOLUTION AVAILABLE. NO VIEWING HIGH DEFINITION TELEVISION CHANNELS.

☐ RECORD LOWER RESOLUTION. VIEWING ALL CHANNELS PERMITTED.

FIG. 4a

YOU HAVE SELECTED HIGHEST RESOLUTION RECORDING. YOU WILL NOT BE ABLE TO VIEW OTHER HIGH DEFINITION CHANNELS WHILE RECORDING.

< BACK          OK

FIG. 4b

|  | PROGRAM DESCRIPTION: |
|---|---|
|  | CHANNEL 102 - 10:00am - 11:00am<br>SIX MILLION DOLLAR MAN<br><br>OSCAR IS CAPTURED BY A FOREIGN GOVERNMENT AND A LOOK-ALIKE ROBOT IS PUT IN HIS PLACE |

| | 9:00am | 9:30am | 10:00am | 10:30am | 11:00am |
|---|---|---|---|---|---|
| CHANNEL 101 | GILLIGAN'S ISLAND | LEAVE IT TO BEAVER | BEWITCHED | I DREAM OF GENIE | MOD SQUAD |
| CHANNEL 102 | BEVERLY HILLS 90210 | | SIX MILLION DOLLAR MAN | | WILD WILD WEST |
| CHANNEL 103 | BEVERLY HILLBILLIES | HOGAN'S HEROES | ADDAM'S FAMILY | MUNSTERS | MY THREE SONS |

USE THE ARROW KEYS TO CHANGE SELECTION. PRESS SELECT TO SCHEDULE RECORDING.

FIG. 6a

PROGRAM DESCRIPTION:

CHANNEL 102
THURSDAY, OCTOBER 28, 1999
SIX MILLION DOLLAR MAN
(10:00am - 11:00am)

OSCAR IS CAPTURED BY A FOREIGN GOVERNMENT AND A LOOK-A-LIKE ROBOT IS PUT IN HIS PLACE (CC)

[OK]  [CANCEL]

| | 9:00am | | | | 11:00am |
|---|---|---|---|---|---|
| CHANNEL 101 | GILLIGAN'S ISLAND | | | I DREAM OF GENIE | MOD SQUAD |
| CHANNEL 102 | BEVERLY | | | DOLLAR MAN | WILD WILD WEST |
| CHANNEL 103 | BEVERLY HILLBILLIES | | | MUNSTERS | MY THREE SONS |

USE THE ARROW KEYS TO CHANGE SELECTION. PRESS SELECT TO SCHEDULE RECORDING.

FIG. 6b

SYSTEM AND USER INTERFACE FOR A TELEVISION RECEIVER IN A TELEVISION PROGRAM DISTRIBUTION SYSTEM

This application claims the benefit under 35 U.S.C. §365 of International Application PCT/US00/30385, filed Nov. 3, 2000, which claims the benefit of U.S. Provisional Application 60/163,609, filed Nov. 4, 1999.

FIELD OF THE INVENTION

The present invention relates to a system and user interface for processing digital data, containing a plurality of time multiplexed data streams, some of which represent video signals, and in particular coded high-definition (HD) video signals, to derive a decoded video signal suitable, for example, for recording or producing a picture-in-picture (PIP) or other reduced resolution purposes.

DESCRIPTION OF THE PRIOR ART

Television receivers are known that, while displaying a relatively large picture derived from a primary television channel, also can simultaneously display a small subimage such as a picture-in-picture (PIP) derived from a secondary television channel. For high-definition television (HDTV) receivers, the large picture may be derived from a high-definition source, and be displayed with a corresponding high visual resolution. However, because the PIP is small, there is no need to provide a high definition PIP display because a viewer inherently would not be able to resolve the higher definition components of a high definition PIP. Viewers also sometimes desire to record television signals. Standard analog video cassette recorders (VCRs) cannot record HDTV signals at their full resolution. Therefore, before a HDTV channel may be recorded on a standard VCR, it must be transformed into a lower resolution e.g. NTSC format video signal. This lower resolution signal may then be supplied to the VCR.

In a digital television signal distribution system, a plurality of digital data streams, each representing a respective video signal, are time multiplexed together and transmitted to the receiver, in a known manner. The digital data in each of the plurality of data streams is encoded and highly compressed according to known encoding schemes, such as MPEG encoding, and must be decoded to regenerate any of the video signals represented by it. Known HDTV receivers include a relatively complex and expensive decoder that conforms with the ISO 13818-2 standard for decoding a received coded HD video signal in real time to generate a high-definition video signal for the high definition display device in the receiver. This decoder uses all of the transmitted data in the data stream representing that video signal to reproduce the high-definition video signal representing the transmitted image. However, as described above, a lower resolution video signal is generated for a PIP and/or VCR. This process involves two steps. First, the digital data stream is decoded into a video signal represented by that data stream. Second, this video signal is sample-rate-converted to the lower resolution, e.g. NTSC, video format.

To provide the PIP and/or VCR video signal, known HDTV receivers also include a second, lower-resolution, simpler and less expensive, decoder which also conforms with the ISO 13818-2 standard. This decoder, however, uses only a portion of the transmitted data in the data stream representing that video signal to reproduce a low-definition video signal representing the transmitted image. Consequently, this video signal possibly represents an image which contains visible and objectionable artifacts. For a PIP image, this is not a problem, because the small size of the PIP image makes such artifacts practically invisible to the viewer. However, an image to be recorded and played-back will most likely be displayed at full size, allowing these artifacts to remain visible, and possibly objectionable. If a high-definition TV program is selected to record, a choice exists for how to produce the low-resolution video signal. First, the high definition video data may be first decoded using the low resolution decoder. This produces a low resolution video signal having artifacts, as described above. This low-resolution signal is then scan-rate-converted into the low resolution, e.g. NTSC, format. Alternatively, the high resolution data may be first decoded using the high resolution decoder. This produces a high resolution video signal free of artifacts. This high resolution signal is then scan-rate-converted into the low resolution, e.g. NTSC, format.

A receiver including two decoders is relatively expensive. Further developments have led to an arrangement in which a single decoder was able to be "shared" by two video data streams. Such a decoder was developed which was time multiplexed to be able to decode multiple data streams from the time multiplexed data stream. Such a decoder produces two output signals independently, representing two of the plurality of video signals in the data stream. However, a practical single decoder may not be constructed in an economical manner to simultaneously decode two HDTV signals. Instead, such a decoder may decode a single HDTV signal, and a second signal decoded at lower resolution.

A number of problems arise in providing a User interface suitable for operation of an HDTV (or other digital TV) receiver employing decoder units capable of simultaneously processing multiple images for display and/or recording. Such problems arise because of the increased number of processing options available to a User, bandwidth constraints of the decoder, and different system and peripheral configurations (e.g. different storage and playback units) that may be used in an HDTV entertainment system. These problems and derivative problems are addressed by a system according to the present invention.

SUMMARY OF THE INVENTION

In accordance with principles of the present invention a television receiver includes a source of digital data comprising a plurality of data streams each representing one of a standard definition television signal and a high definition television signal and encoded in such a manner that it may be decoded at full resolution to produce an image substantially without visible decoding artifacts or decoded at partial resolution to produce an image possibly including visible decoding artifacts. A decoder is coupled to the digital data source, and has a maximum decoding bandwidth less than that required to simultaneously decode two high definition television signals at full decoding resolution. A controller, is coupled to the decoder, for selecting two respective ones of the data streams responsive to user input, and if both represent a high definition television signal, requesting user input for specifying one of the two respective data streams to decode at partial resolution.

A television receiver according to the present invention allows the user to select whether a signal desired for recording is decoded at partial resolution, or at full resolution.

BRIEF DESCRIPTION OF THE DRAWING

FIGS. 2a, 3a, 3b, 4a, 4b, 4c, 4d, 5a, 5b, 6a, 6b, and 6c are diagrams of a television video images which may be displayed on a display device in a television receiver illustrated in FIG. 1;

DESCRIPTION OF THE PREFERRED EMBODIMENTS

Figure 1:
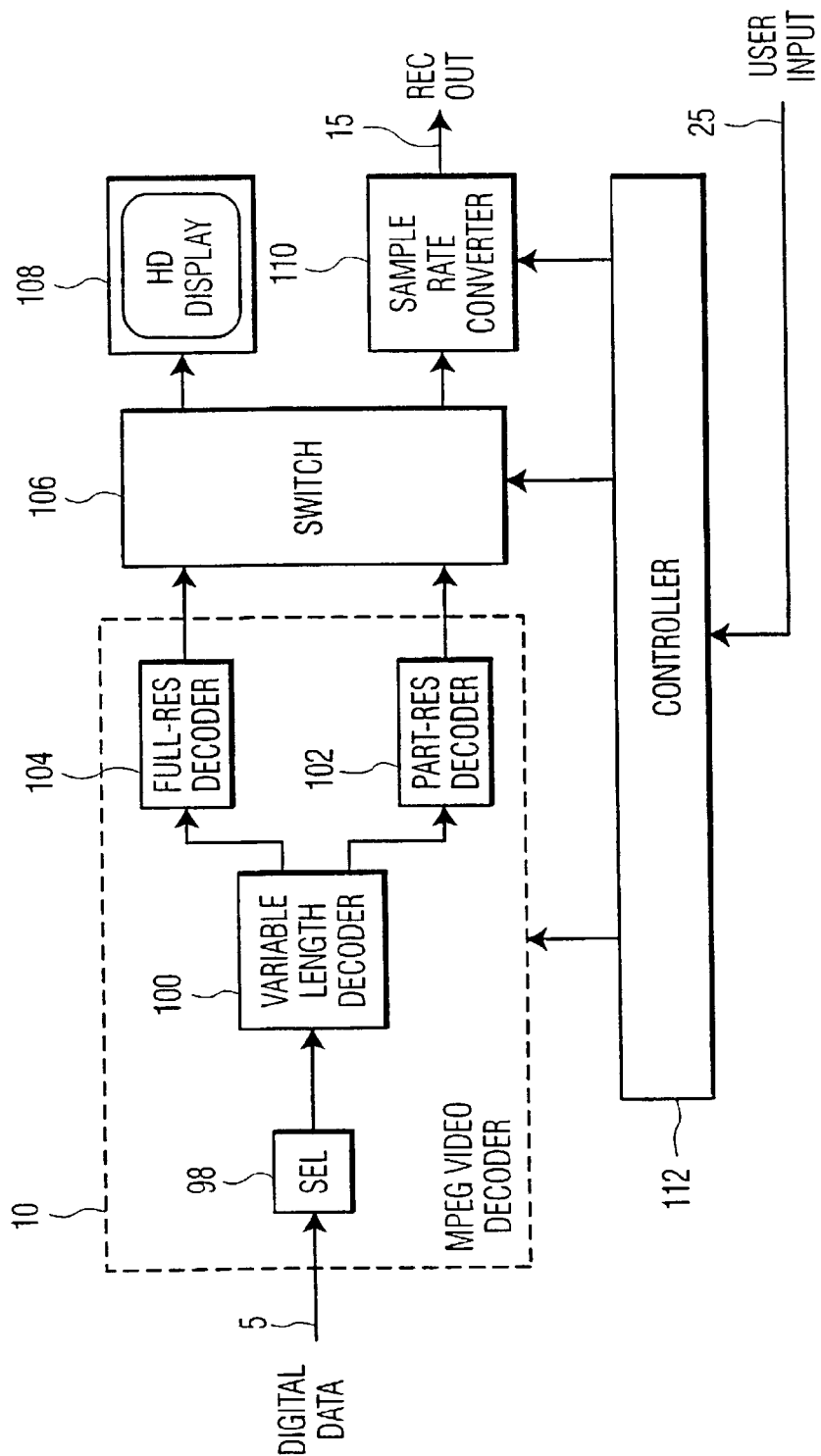
FIG. 1 is a block diagram of a portion of an HDTV receiver according to principles of the present invention.

FIG. 1 is a block diagram of a portion of an HDTV receiver according to principles of the present invention. In FIG. 1, only those elements necessary for an understanding of the present invention are illustrated. One skilled in the art will understand that many other elements necessary in an HDTV receiver are not illustrated, and will understand what those elements are, how to design and implement them, and how those other elements are interconnected with the illustrated elements. In FIG. 1, an input terminal 5 is coupled to a source (not shown) of digital data including a plurality of time multiplexed data streams, each representing a video signal. Some of these data streams may represent high-definition video images, while others may represent standard-definition video images. In the illustrated embodiment, the video signal data streams in the digital data are encoded using known MPEG encoding, although other encoding techniques may be used. Other data streams, representing other signals may also be included in this digital data. For example, one or more of the data streams may contain data representing an audio signal corresponding to a video signal data stream, or representing a program guide containing information relating to the content of the respective television programs multiplexed within the digital data, all in a known manner. The digital data source (not shown) may be, for example, a satellite receiver, a cable receiver, a digital recorder playback output, or any source providing such a signal.

Input terminal 5 is coupled to an input terminal of an MPEG video signal decoder 10. In FIG. 1, the input terminal 5 is coupled to an input terminal of a data stream selector 98 within the MPEG decoder 10. An output terminal of the selector 98 is coupled to an input terminal of a variable length codeword decoder (VLD) 100. A first output terminal of the VLD 100 is coupled to a partial-resolution decoder 102. A second output terminal of the VLD 100 is coupled to an input terminal of a full resolution decoder 104. Respective output terminals of the partial resolution decoder 102 and the full resolution decoder 104 are coupled to corresponding input terminals of a switching circuit 106. A first output terminal of the switching circuit 106 is coupled to a display device 108. The display device 108 is integrated in the television receiver and is capable of displaying a high-definition video image. One skilled in the art will understand that a sample rate converter (not shown) may be required to generate high definition television signals for the HDTV display device 108. One skilled in the art will also understand that this output terminal of the switching circuit 106 may also be coupled to an output terminal of the television receiver, and, thus, made available to equipment external to the television receiver, such as a standalone video monitor.

A second output terminal of the switching circuit 106 is coupled to a sample rate converter 110. An output terminal of the sample rate converter 110 produces a low resolution video signal suitable to be recorded on a standard VCR, and is coupled to an output terminal 15. In FIG. 1, this signal is an NTSC format television signal, though other formats, such as PAL or SECAM, or any other such format may also be used. The output terminal 15 may be connected to a VCR (not shown) capable of recording the signal produced by the scan rate converter 110.

A controller 112 has respective control output terminals coupled to corresponding control input terminals of the MPEG video decoder 10, the switching circuit 106 and the sample rate converter 110. More specifically, the controller 112 produces control signals for the internal circuits within these elements, such as for the data stream selector 98, VLD 100, the partial resolution decoder 102 and the full resolution decoder 104 in the MPEG video decoder 10. Other control signals may be generated by the controller 112 and supplied to other, non-illustrated, circuitry in the illustrated embodiment, all in a known manner. The controller 112 may also generate video image signals, and couple those image signals, through the switching circuit 106, to the display device 108. For example, such images may represent on-screen-displays (OSDs) for presenting information to the user, and requesting command information back from the user, also in a known manner. A user input terminal 25 receives data representing user command data. The user input terminal 25 may be coupled to a control panel (not shown) on the television receiver, including, for example, buttons for entering control information. The user input terminal 25 may also be coupled to a receiver (not shown) for receiving data from a remote control device (also not shown), also including buttons for entering control information, possibly similar to those on the receiver control panel (if any), and capable of being operated by a user from a remote location, such as across the room from the receiver, all in a known manner.

In operation, the MPEG decoder 10 operates in a time multiplexed manner to simultaneously decode more than one video data stream from the MPEG digital data at input terminal 5, representing respective video signals, selected in response to a control signal from the controller 112. More specifically, the selector 98 operates to extract the selected data streams from the digital data and provide only those data streams to the variable length codeword decoder 100. The data in those data streams includes successive variable length codewords. As is known, the codewords represent, among other things, coefficients of spatially encoded discrete cosine transform (DCT) macroblocks each representing a small block of the image represented by that data stream. In a known MPEG embodiment, up to 64 coefficients represent each macroblock. The VLD 100 produces respective streams of DCT coefficients from the selected data streams. The DCT coefficients related to one of the selected data streams are supplied to the full resolution decoder 104, while the DCT coefficients related to another one of the selected data streams are supplied to the partial resolution decoder 102, in response to a control signal from the controller 112. The full resolution decoder 104 processes all of these 64 coefficient codewords to reproduce a video signal representing the image. This results in a video signal having the maximum quality. The partial resolution decoder 102, however, processes only a fraction of these 64 coefficient codewords. For example, in a known embodiment, only 6 of the 64 coefficients are processed to regenerate each macroblock in the image. This results in an image missing some of the information which was transmitted to the receiver. Because transmitted information is missing from the reproduced image, artifacts may be present in the image, and those artifacts may be visible and objectionable.

The switching circuit 106 couples the respective output terminals of the MPEG decoder 10, from the full resolution decoder 104 and the partial resolution decoder 102 respectively, to either the display device 108 or the sample rate converter 110, in response to control signals from the controller 112. The display device 108 displays the image represented by the video signal coupled to its input terminal, in a known manner. The sample rate converter 110 converts the data at its input terminal to a low resolution format video signal, such as an NTSC format signal, and supplies that signal to the output terminal 15, in a known manner.

The controller 112 includes a processor (not shown) which operates in accordance with a software program, in a known manner. The controller 112 is programmed to receive commands from the user input terminal 25 and generate appropriate control signals to configure the various circuits to which it is coupled to the desired states. The controller 112 further operates to produce signals representing OSDs to be displayed on the display device 108, all in a manner to be described in more detail below.

The system illustrated in FIG. 1 will support a high resolution video output signal (analog or digital) at one output terminal of the switching circuit 106 while concurrently providing a low resolution output video signal for display/record on an NTSC compatible device at the output terminal of the sample rate converter 110. The two output paths are independent so it is not required that the video signal at the low resolution output terminal be a resampled version of the video signal at the high resolution output terminal. That is, the switching circuit 106 may route any of the decoded pictures from the full resolution decoder 104 and the partial resolution decoder 102 to either of the two output terminals.

The MPEG video decoder 10 has a limited bandwidth in operation which may be described in terms of the total number of macroblocks that may be decoded per second. This bandwidth is shared between the selected data streams in such a way that the MPEG video decoder 10 is effectively time-multiplexed between several source pictures. This MPEG video decoder 10 further includes known display processing (not shown) that will allow the independent scaling and overlay of all decoded pictures. This display processing is used to facilitate multi-picture display modes, including subimages such as PIP, POP and PIG (picture in picture, picture outside picture and picture in graphic).

It is anticipated that the low resolution output terminal 15 from the television receiver illustrated in FIG. 1 will be used to support NTSC recording of digital source material. Current VCRs may have multiple video input terminals. The user will typically navigate a menu system in the VCR to select one of the video input terminals for recording. In a digital system as illustrated in FIG. 1, however, the desired video signal is typically carried by one of the plurality of MPEG encoded digital data streams, and must be extracted and decoded before being output to an analog video recorder. As such, part of the process of selecting a signal to record on a VCR must be located within the digital television receiver itself. The television receiver, therefore, must also include a user interface to allow a user to navigate and select from among the range of video signals supplied to the receiver that may be directed to the record output terminal 15, and thus to the record input terminal of the VCR. The remainder of this application will describe the user interface in the television receiver.

Figure 2A:
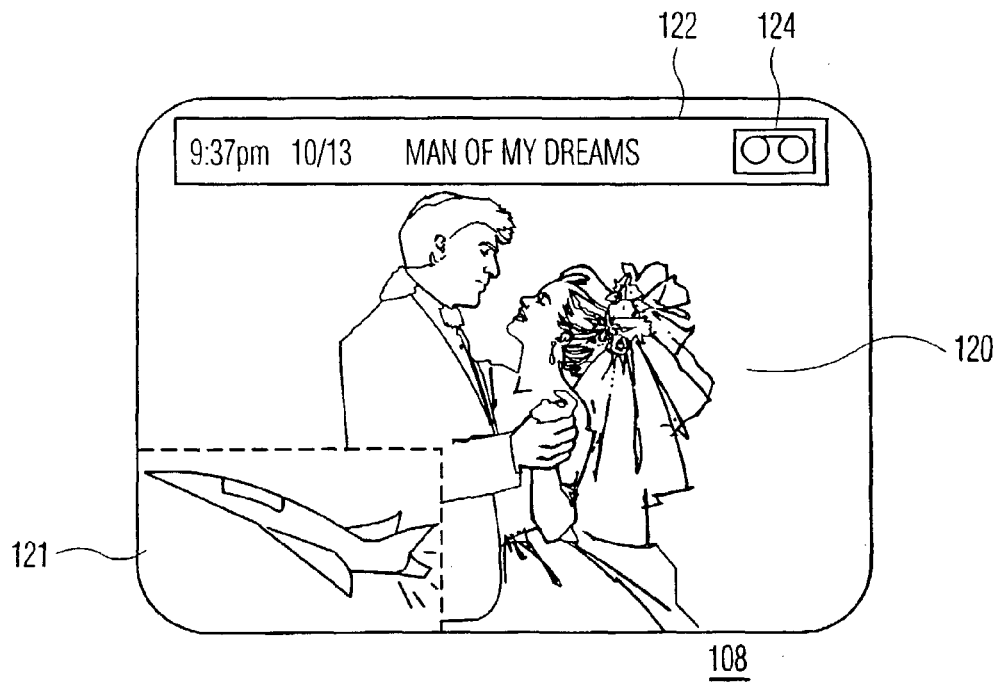
Figure 2B:
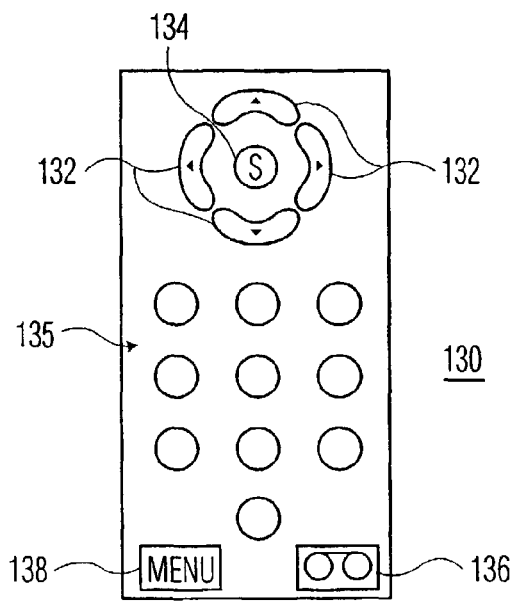
FIG. 2b is a diagram of the layout of a remote control device which may be used in conjunction with a television receiver illustrated in FIG. 1.

FIGS. 2a, 3a, 3b, 4a, 4b, 4c, 4d, 5a, 5b, 6a, 6b and 6c are diagrams of television video images which may be displayed on a display device 108 in a television receiver illustrated in FIG. 1, and FIG. 2b is a diagram of the layout of a remote control device 130 which may be used in conjunction with a television receiver illustrated in FIG. 1. Referring to FIG. 2a, under some conditions, the image 120 displayed on the display device 108 will be controlled by the controller 112 (of FIG. 1) to include a banner display 122, meaning an overlay along one edge of the display screen 108, typically the top, in a known manner. In the illustrated embodiment, the banner display 122 includes the time, date and title of the program currently being displayed. In some configurations of the banner display 122, a 'quick record' icon 124 may be also displayed. Referring again to FIG. 1, the controller 112 monitors the user input terminal 25 to detect user commands, also in a known manner.

The user may invoke a record menu system in the television receiver by highlighting and selecting the 'quick record' icon 124 from the display banner 122 using e.g. the control panel on the television receiver or the remote control 130. To do this on the remote control 130, the user would press the directional buttons 132 on the remote control 130 until the 'quick record' icon 124 is highlighted, then press the select button 134. Alternatively, the user may invoke the record menu system by pushing the "record" button 136 on the remote control 130. The user may also invoke the record menu system by maneuvering through the receiver program guide menu system in a manner to be described in more detail below.

When the record menu is invoked by any of these methods, the system will at first assume that the user wishes to record one of the programs that is currently being displayed on the display device 108. If only one program is currently displayed on the screen the record operation will begin for that program. The switching circuit 106 will be conditioned by the controller 112 to couple the video signal being supplied to the display device 108 to the sample rate converter 110 also. The sample rate converter 110 will convert the signal to an NTSC signal, which is supplied to the record output terminal 15. The currently displayed picture will, thus, be formatted for NTSC output. In addition, when possible the video recorder will be signaled by the television receiver to begin recording via the VCR remote control link. It is anticipated that the video signal supplied to the display device 108 will be decoded at full resolution by decoder 104. However, one skilled in the art will understand that the signal being supplied to the display device 108 could be either a high definition or standard definition video signal, and it could be either decoded at full resolution by the full resolution decoder 104 or at partial resolution by the partial resolution decoder 102

In FIG. 2a, a second image 121, in PIP format, is illustrated in phantom in the bottom left hand corner of the display device 108. More than one such picture could be included in the image displayed on the display device 108. If more than one program image is currently displayed on the display device 108, e.g. main image 120 and PIP 121, then, when the record menu system is invoked in the manner described above, a visual cue on the display device 108 will highlight one of the displayed program images (120, 121) and a graphic will be created to inform the user which program will be recorded. The user then may confirm or cancel the recording operation. For example, in FIG. 3a, a bold black box 126a is displayed around the main program video image 120 to indicate that it is the current selection for the record output terminal 15. An on-screen display of a confirmation box 128a is generated by the controller 112 (of FIG. 1) and also displayed on the display device 108. In the illustrated embodiment, this confirmation box 128a includes the channel number, the program title, and a brief description of the main image 120 program. The OK button of the confirmation box 128a is shown as depressed in order to indicate that it is the default selection for the confirmation box 128a. That is, when the user presses the select button 134 on the remote control 130, the default selection is activated. If the user presses the select button 134 on the remote control 130, activating the OK button, thus, confirming this selection for recording, the video signal representing the main image 120 will be supplied to the sample rate converter 110, and recording will begin.

Figure 3A:
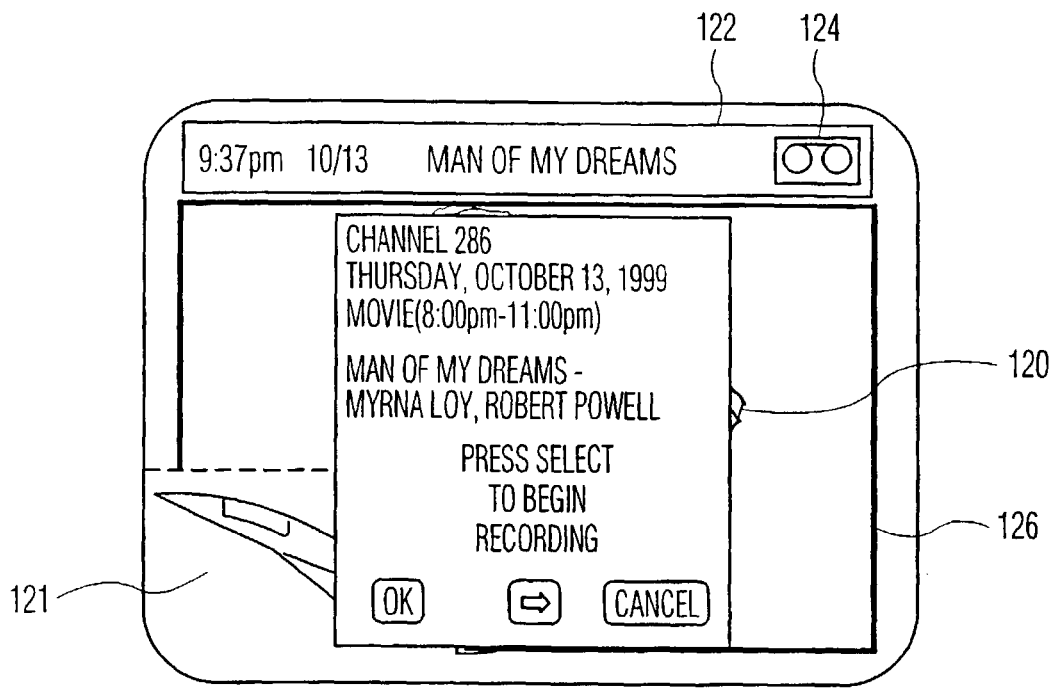
Figure 3B:
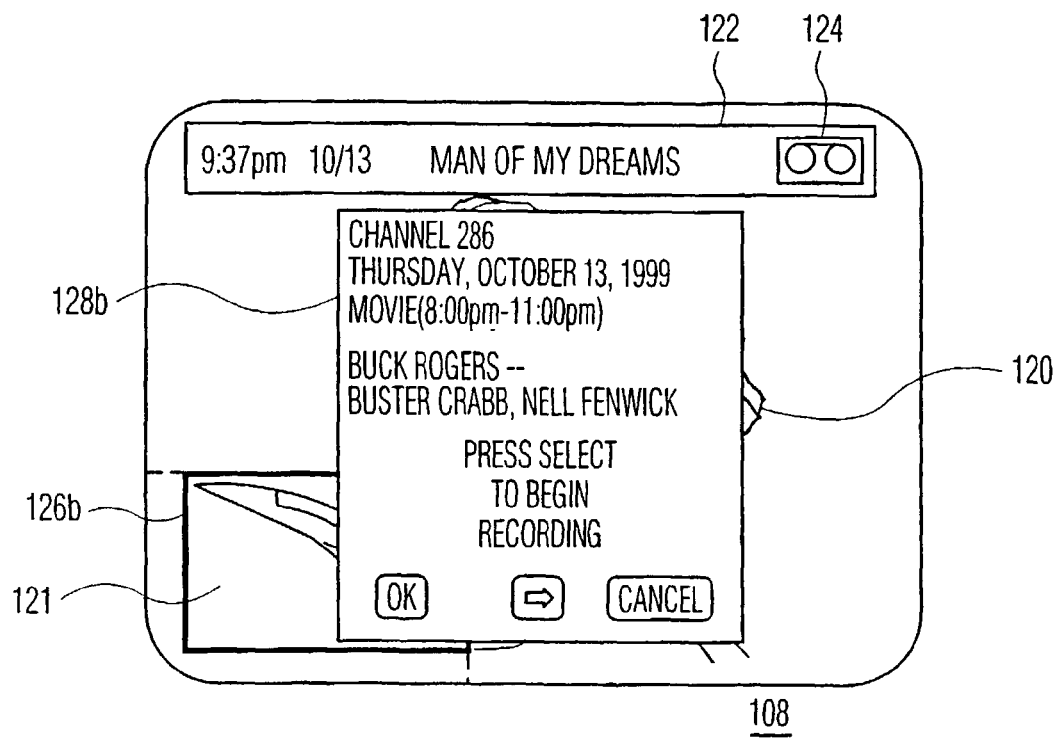

If the user does not want to record the video displayed in the main program video image 120, then the directional keys 132 on the remote control 130 may be pressed. This will condition the controller 112 to make the arrow button the default selection, and to show the arrow button as depressed (not shown—but similar to the depressed OK button illustrated in confirmation box 128*a*). This, in turn, indicates that a different program is desired for recording. If the select button 134 on the remote control 130 is then pressed, the next program currently being displayed on the display device 108 will be highlighted. As illustrated in FIG. 3*b*, the PIP image 121 is selected, and a bold black box 126*b* is displayed around the PIP image 121. Similarly to FIG. 3*a*, a confirmation box 128*b* is displayed, including the channel number, program title and brief description of the PIP image 121 program. If the user wishes to confirm that the PIP image 121 program is to be recorded, then the directional keys 132 on the remote control 130 are again pressed. The controller 112 in response makes the OK button the default selection, and generates the confirmation box 128*b* with the OK button depressed, as illustrated. If the user presses the select button 134 on the remote control 130, activating the OK button, and confirming this selection for recording, the video signal representing the PIP image 121 will be supplied to the sample rate converter 110, and recording will begin. On the other hand, if yet another displayed program (not illustrated in FIG. 3) is desired, then the arrow button on the confirmation box 128*b* may be activated again, by pressing the select button 134 on the remote control 130, until the desired program is highlighted. Then the OK button is activated, as described above, to begin recording of the selected program.

The order of navigating among the displayed programs may be flexible and may be chosen in a way that is consistent with other menu operations in the television receiver and that may be easily understood by the user. For example, video windows may be navigated in order from the top of the screen to the bottom, and from left to right. The top left corner of each video window may be used as its point of reference when creating the select order for the displayed windows. If two or more windows have the same point of reference, then the windows will be selected in top to bottom order according to their stacking in the overlay. A system with a more sophisticated controller 112 and remote control 130 combination may allow a user to directly indicate which of the displayed programs should be recorded, e.g. by pressing digit buttons 135.

One skilled in the art will recognize that known Copy Generation Management System (CGMS) markers may be present in some of the received programs. These markers will be detected and recognized by known circuitry (not shown) in the television receiver. The controller 112 will receive a status signal (not shown) from the detection and recognition circuitry indicating if such markers are present in a displayed program, thereby indicating that the program is not available for recording. When in the record menu system a graphical and/or text cue will be used to indicate those programs which are marked as not available for recording by such markers. For example, when moving the selection from one displayed program to another by activating the arrow button on the confirmation box (128*a*, 128*b*), those programs that are not available for record will be automatically skipped. Some systems, however, may allow for direct selection of a program window for recording, e.g. by pressing the number buttons 135 on the remote control 130. In this case, an attempt to select a program that is not available for record will trigger the display of an on-screen message, similar in form to the confirmation boxes 128*a* and 128*b*, that explains that the program may not be recorded.

Figure 4C:
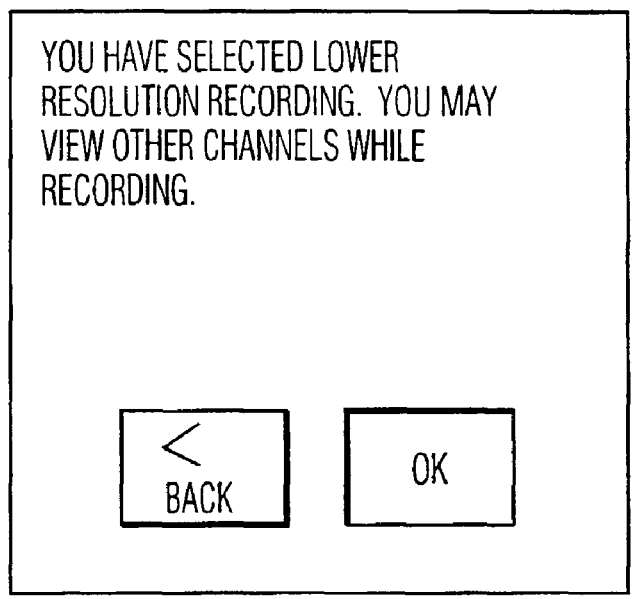

If the selected record program is a standard definition television signal, i.e. MPEG Main Profile, Main Level or less, then the MPEG decoder 10 will be conditioned by the controller 112 to decode the record program in full resolution, because there is enough decoder 10 bandwidth to simultaneously decode a standard definition and a high definition television program (for the display device 108, for example) at full resolution. If, however, the selected record program is a high definition television signal, then the MPEG decoder 10 will not have sufficient bandwidth to simultaneously decode both the selected record program and another high definition television program at full resolution. Typically the record program would be decoded at partial resolution. However, in some cases, a user may wish to record a program at NTSC resolution without the artifacts introduced by the partial resolution decoder 102. Referring to FIG. 4, if the selected record program is a high definition television signal then the controller 112 will generate an OSD in a known manner in which the user will be prompted to select between decoding the record program using the full resolution decoder 104 or the partial resolution decoder 102, as illustrated in FIG. 4*a*. If the user selects the full resolution decoder 104, then the user is informed that it is not possible for another high definition programs to be decoded and displayed while the record is in progress (because there is insufficient bandwidth in the MPEG video decoder 10), as illustrated in FIG. 4*b*. If the user selects the partial resolution decoder 102, then the user is informed that there are no restrictions on what other programs may be decoded and displayed while the recording is in progress, as illustrated in FIG. 4*c*. Once all the appropriate selections have been made by the user, the selected program, decoded in the selected manner, is started.

Figure 5A:
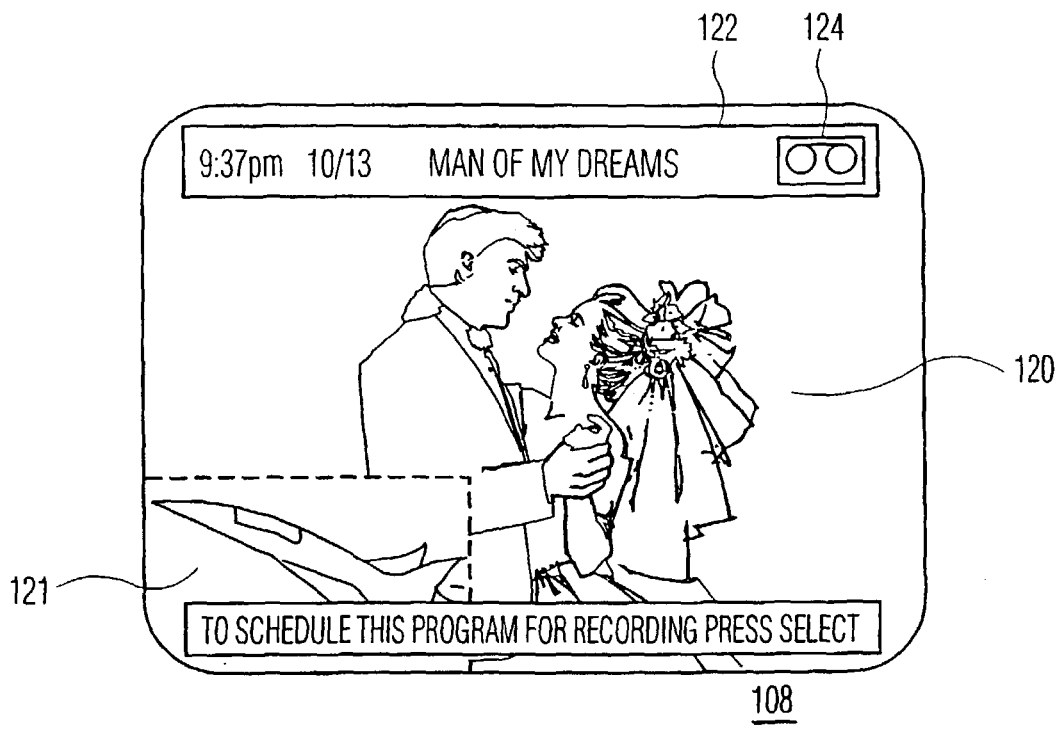
Figure 5B:
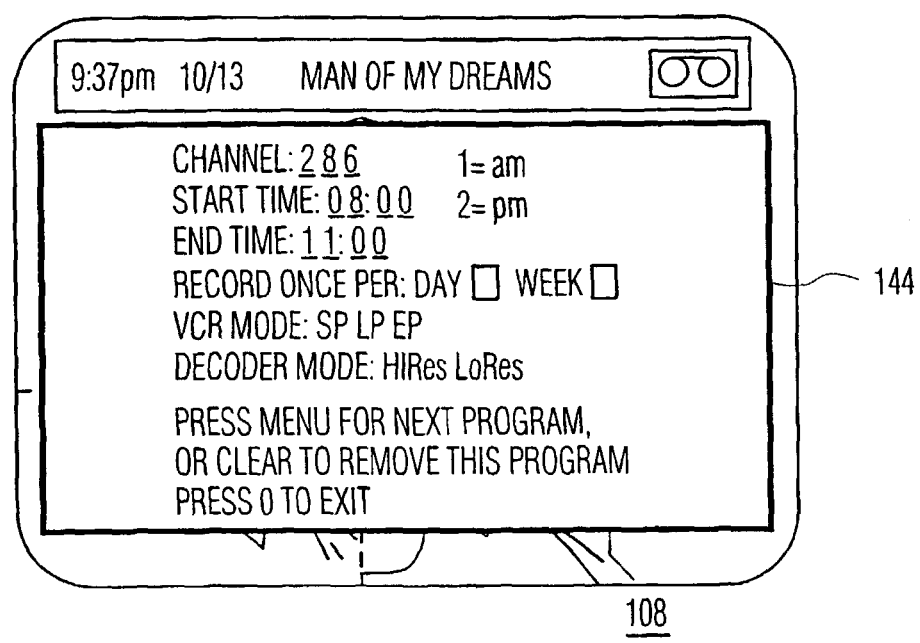
Figure 6C:
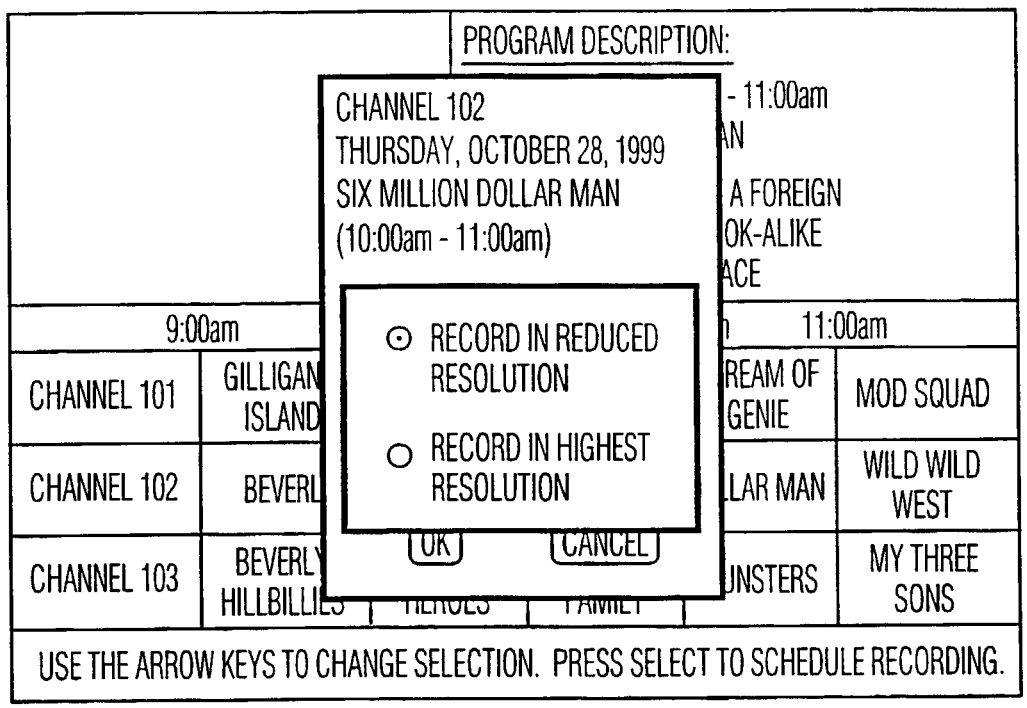

Referring to FIG. 5*a*, after recording of the selected program is started, the user will be asked whether the user desires to record this program on a schedule. In the illustrated embodiment, the controller 112 generates an OSD banner 142 on the bottom of the screen which asks the user to press 'Select' to add this program to the record schedule. Referring to FIG. 5*b*, if the user presses the select button 134 on the remote control 130, a record schedule menu 144 will be displayed under the control of the controller 112. Those fields that can be filled in based on information known about the selected program will be shown with the appropriate data already entered. The cursor will be placed in the field that allows a user to select the frequency of the record event. The user may then enter desired information using the remote control 130 in a known manner. The controller 112 receives this information, and generates an appropriate schedule entry containing the user-entered information.

Figure 4D:
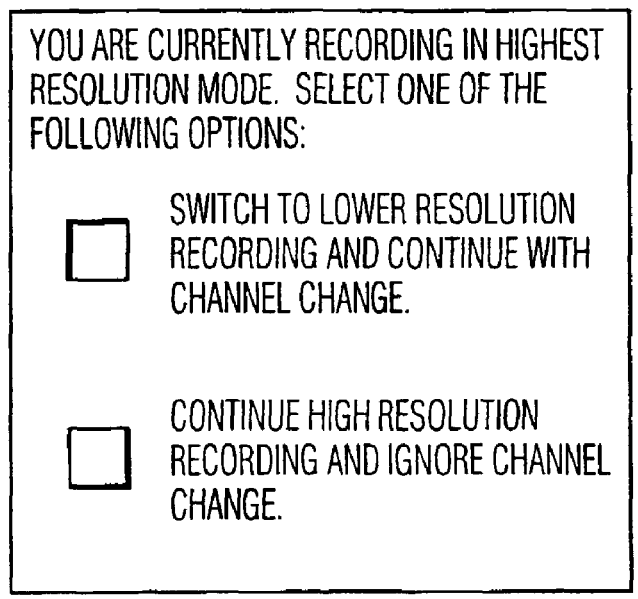

As described above, if a high definition television program is being decoded at full resolution for recording, then the user is restricted to standard definition television programs only for viewing on the display device 108. This restriction may be enforced in different ways. One, simple, approach would be for the controller 112 to condition the display device 108 to display a black screen when an attempt is made to display a high definition television program on the display device 108. The controller 112 may further generate an OSD, to be overlaid atop the black screen, with a message informing the user that the requested program is not available while recording is in progress. The OSD may also simply give the user the option to terminate the record session and change channels to display the desired program on the display device 108 (not shown). Alternatively, the OSD may give the user the option of continuing the record session, by switching to partial resolution decoding of the record program, and change channels to display the desired program on the display device 108, or continue the record session and ignore the channel change request, as illustrated in FIG. 4*d*. Referring to FIG. 4*d*, pressing the select button 134 in this context would condition the controller 112 to display the confirmation box illustrated in FIG. 4*c*. This confirmation box would allow the user to either confirm or cancel the channel change for display and resolution change for the record program, by appropriate pressing of the directional buttons 132 and the select button 134, in the manner described above. Alternatively, the user may manipulate the directional buttons 132 and select button 134 to continue the high resolution recording and ignore the channel change. In response, the controller 112 displays the confirmation box illustrated in FIG. 4*b*, that again would allow the user to either confirm or cancel continuing the record session, by appropriate pressing of the directional buttons 132 and the select button 134.

Another approach to enforce the MPEG video decoder 10 restrictions, described above, would be for the controller 112 to implement what will be termed in this application an intelligent channel scan. When the record output terminal 15 video signal is being generated from a high definition television signal using the full resolution decoder 104, the controller 112 would generate program guide listings (FIG. 6*a*) from which all other channels broadcasting high definition television material would automatically be removed. Attempts by a user to directly enter the channel number, e.g. using the digit keys 135 on the remote control 130, for a channel that carries a high definition television signal would be detected by the controller 112, which would generate the above mentioned OSDs (FIGS. 4*b*, 4*c* and 4*d*) atop a black screen explaining that the requested channel is not available while recording is in progress. The same options would then be presented to cancel the record operation.

If the high definition television program selected for recording had been previously scheduled for a future time (see FIG. 5 and associated description), then a second high definition television program may be decoded by the full resolution decoder 104 and displayed on the display device 108 until the scheduled record start time arrives. However, if the end time of the high definition television program being viewed would overlap the recording start time for the scheduled record program, then the controller 112 will generate a warning banner (similar to 142), to be displayed e.g. across the bottom of the screen of the display device 108 in a known manner, stating that it will not be possible to continue viewing this program after the scheduled recording begins. If the currently displayed program is a high definition television program, is being decoded in full resolution using the decoder 104, and does not carry information about its end time, then the controller 112 will generate such a warning banner automatically. It is further possible for the controller 112 to display the warning banner only after a user has displayed the channel on the display device 108 for some minimum time period. It is further possible for the controller to remove the banner from the display device 108 after a brief time, on the order of several seconds, or in response to the user pressing the clear button (not shown) on the remote control 130. In addition, the controller 112 may display a warning message in the top right corner of the display device 108 prior to the start of the recording, for example, around 1 minute before the starting time for recording. This displayed message also will offer the user the opportunity to enter the record menu and preempt the scheduled recording.

The user also has the opportunity at any time to enter the record menu system to create, modify or delete scheduled recording events. This menu is accessed through the TV main menu and may be accessed by pressing the menu button 138 on the remote control 130. The controller 112, in response to detecting the press of the menu button 138 will display a menu with several entries on the display device 108, in a known manner. One of those entries will be "schedule". By appropriate pressing of the directional buttons 132 and the select button 134, the controller 112 will similarly display a "schedule" menu, with several entries. One of those entries will be "record". Again, by appropriate pressing of the directional buttons 132 and the select button 134, the controller 112 will display a recording scheduling display. This is identical to the recording scheduling display 144 illustrated in FIG. 5*b*. By entering appropriate information in response to the prompts, all in a known manner, a program may be scheduled for future recording.

As described above, one or more of the data streams in the digital data at the input terminal 5 may carry program guide information, including channel numbers, starting and ending times (or durations), names and brief descriptions of all the programs present in the digital data. Referring to FIG. 1, this information may be extracted by the selector 98, and the data in those data streams provided to the controller 112. Referring to FIG. 6*a*, this data may be processed by the controller 112 to generate a tabular display of this information. The user may condition the controller 112 to show this table on the display device 108, and then may select programs to watch or record from the information in the displayed table on the display device 108 by manipulating the directional keys and select key on the remote control 130, all in a known manner. In FIG. 6*a*, the television program "Six Million Dollar Man" has been selected by the user, and appears highlighted. In FIG. 6*a*, the entry is highlighted by having a white background. One skilled in the art will understand that any method of highlighting may be used.

The record menu may be invoked directly from the program guide display by selecting a program using the directional buttons 132, as described above, and then pressing the record button 136 on the remote control 130. As described above, when a program is selected for recording, the controller 112 generates an OSDs asking for confirmation, as illustrated in FIGS. 4*a*, 4*b* and/or 4*c*. When the program that is selected for record is scheduled to occur at some future time it may be necessary for the user to choose whether the program will be recorded using the full resolution (104) or partial resolution (102) decoder, as illustrated in FIG. 4*d*. The illustrated system will support different on-screen program guide data streams. Some of the program guides provide information about the definition of the program, i.e. standard definition versus high definition. If the program guide indicates that the selected record program is a high definition television program, the user will be immediately prompted for a record resolution, as described in detail above.

The user interface system described above is intended for use in a television program distribution system carrying high-definition television (HDTV) and standard definition video signals, and containing a decoder having a bandwidth in which more than one channel can be decoded simultaneously, subject to the maximum bandwidth of the decoder. In particular, if a user instructs such a distribution system to record a program on a standard-definition medium (e.g., VHS tape), and if the system requires that one of two high-definition format programs be decoded at a reduced resolution for simultaneous decoding, then the proposed invention allows the user to choose between two options for recording: either using full resolution decoding for the record program and forbidding simultaneous decoding and display of any other high-definition television program, or using reduced resolution decoding for the record program, and permitting simultaneous decoding and display of other high-definition television programs.

The invention claimed is:

1. A television receiver comprising:
   a source of digital data comprising a plurality of data streams each representing one of a standard definition television signal and a high definition television signal and encoded in such a manner that it may be decoded at full resolution to produce an image substantially without visible decoding artifacts or decoded at partial resolution to produce an image possibly including visible decoding artifacts;
   a decoder, coupled to the digital data source, having a maximum decoding bandwidth less than that required to simultaneously decode two high definition television signals at full decoding resolution;
   a controller, coupled to the decoder, for selecting two respective ones of the data streams to be simultaneously decoded for non-picture-in-picture use responsive to user input, and if both represent a high definition television signal, requesting user input for specifying one of the two respective data streams to decode at partial resolution such that another one of the two respective data streams is decoded by said decoder at full resolution; and
   a first output terminal and a second output terminal, each configured to allow any single one of a first simultaneously decoded data stream and a second simultaneously decoded data stream to be independently and interchangeably output there from without subsequent demultiplexing with respect to the first and second simultaneously decoded data streams.

2. The receiver of claim 1 further comprising a display device, capable of displaying images, under the control of the controller;
   wherein the controller conditions the display device to display a visual cue to indicate to the user one of the selected data streams and responds to user input to condition the decoder to decode the indicated data stream at partial resolution.

3. The receiver of claim 2 wherein the controller is responsive to user input to either specify the indicated data stream to be decoded at partial resolution or display a visual cue to indicate the other one of the selected data streams.

4. The receiver of claim 2 wherein the controller conditions the display device to display respective images represented by the television signals in the selected data streams, and to generate the visual cue as a box around the image represented by the indicated data stream.

5. The receiver of claim 4 wherein the box is a bold black box.

6. The receiver of claim 2 wherein the controller conditions the display device to generate a confirmation image and requests confirmation from the user of the indicated data stream to be decoded at partial resolution.

7. The receiver of claim 2 wherein the controller conditions the display device to display at least a portion of a schedule of television signals in the plurality of data streams in the digital data, and to generate a visual cue by highlighting a location in the portion of the schedule of a television signals representing the indicated data stream and responds to user input to specify the indicated data stream to be decoded at partial resolution.

8. The receiver of claim 7 wherein the controller is responsive to user input to either highlight a different location in the portion of the schedule of a television signals to represent the indicated data stream or display a visual cue to indicate a different location in the portion of the schedule of television signals to represent the indicated data stream.

9. The receiver of claim 7 wherein the controller conditions the display device to display the visual cue as a tabular display of the schedule of television signals in which each signal occupies one entry in the table, and the entry for the indicated data stream is highlighted.

10. The receiver of claim 7 wherein the controller conditions the display device to generate a confirmation image and requests confirmation from the user of the indicated data stream to be decoded at partial resolution.

11. The receiver of claim 1, wherein the user input used to select the two respective ones of the data streams and the user input for specifying one of the two respective data streams to decode at partial resolution are both non-picture-in-picture user inputs.

12. The receiver of claim 1, wherein the user input used to select the two respective ones of the data streams and the user input for specifying one of the two respective data streams to decode at partial resolution are both directed to full-screen representations of the two respective ones of the data streams.

13. The receiver of claim 1, wherein any one of the first and the second simultaneously decoded data streams is capable of being output from any one of the first and the second output terminals as the high definition television signal at full resolution.

14. The receiver of claim 1, wherein the first and the second output terminals directly provide any one of the first and the second simultaneously decoded data streams externally with respect to the receiver.

15. A television receiver comprising:
   a source of digital data comprising a plurality of data streams each representing one of a standard definition television signal and a high definition television signal and encoded in such a manner that it may be decoded at full resolution to produce an image substantially without visible decoding artifacts or decoded at partial resolution to produce an image possibly including visible decoding artifacts;
   a display device capable of displaying images represented by decoded television signals;
   a record signal output terminal capable of producing a record video signal;
   a decoder, coupled between the digital data source and the display device and the record signal output terminal, having a maximum decoding bandwidth less than that required to simultaneously decode two high definition television signals at full decoding resolution;
   a controller, coupled to the decoder, for selecting two respective ones of the data streams to be simultaneously decoded for non-picture-in-picture use responsive to user input, and if both represent a high definition television signal, requesting user input for specifying one of the two respective data streams to decode at partial resolution such that another one of the two respective data streams is decoded by said decoder at full resolution; and
   a first output terminal and a second output terminal, each configured to allow any single one of a first simultaneously decoded data stream and a second simultaneously decoded data stream to be independently and interchangeably output there from without subsequent demultiplexing with respect to the first and second simultaneously decoded data streams.

16. The receiver of claim 15 wherein the controller conditions the decoder to decode a first one of the selected data streams at full resolution to provide an image to the display device in response to user input.

17. The receiver of claim 16 wherein the controller conditions the decoder to simultaneously decode the second one of the selected data streams at partial resolution to provide an image to the display device in response to user input wherein the image represented by the first one of the selected data streams forms a main image, and the image represented by the second one of the selected data streams forms a sub image.

18. The receiver of claim 17 wherein the controller is responsive to user input to indicate one of the selected data streams, and provide a television signal represented by the indicated data stream to the record signal output terminal.

19. The receiver of claim 18 wherein the controller conditions the display device to generate the visual cue as a box around the image represented by the indicated data stream.

20. The receiver of claim 19 wherein the box is a bold black box.

21. The receiver of claim 18 wherein the controller conditions the display device to display an image requesting input from the user whether to decode the indicated data stream at full resolution or partial resolution, and responsive to user input conditions the decoder to decode the indicated data stream at the resolution specified by the user input.

22. The receiver of claim 21 wherein the controller conditions the display device to display an image indicating the specified resolution, and requesting confirming user input.

23. The receiver of claim 21 wherein if the user input specifies the indicated data stream should be decoded at full resolution, the controller conditions the decoder to decode the indicated data stream at full resolution and supplies the television signal represented by the decoded indicated data stream to the record signal output terminal, and restricts data streams representing high definition television programs from being displayed on the display device.

24. The receiver of claim 23 wherein if the other one of the selected data streams represents a high definition television signal, the controller conditions the decoder to decode the other one of the selected data streams at partial resolution.

25. The receiver of claim 23 wherein the controller is responsive to user input to ignore requests that a high definition television signal be displayed on the display device.

26. The receiver of claim 23 wherein if the controller receives user input requesting that a high definition television signal be displayed on the display device, the controller conditions the display device to display an image indicating that it is not permitted.

27. The receiver of claim 26 wherein the controller conditions the display device to display an image which is a black screen.

28. The receiver of claim 27 wherein the controller conditions the display device to display an image which further includes information informing the user that the decoder is currently decoding a data stream at full resolution for the record signal output terminal displayed atop the black screen.

29. The receiver of claim 28 wherein:
the controller further conditions the display device to display an image requesting user input to determine whether to stop decoding a data stream at full resolution for the record signal output terminal and display the requested high definition television signal on the display device; and
if user input specifies that decoding of the data stream at full resolution for the record signal output terminal is to stop, the controller conditions the decoder to decode the high definition television signal for the display device at partial resolution, and simultaneously decode the requested television program at full resolution for display on the display device.

30. The receiver of claim 29 wherein the controller conditions the display device to display an image requesting confirmation of the requested user input.

31. The receiver of claim 15, wherein the user input used to select the two respective ones of the data streams and the user input for specifying one of the two respective data streams to decode at partial resolution are both non-picture-in-picture user inputs.

32. The receiver of claim 15, wherein the user input used to select the two respective ones of the data streams and the user input for specifying one of the two respective data streams to decode at partial resolution are both directed to full-screen representations of the two respective ones of the data streams.

33. The receiver of claim 15, wherein any one of the first and the second simultaneously decoded data streams is capable of being output from any one of the first and the second output terminals as the high definition television signal at full resolution.

34. The receiver of claim 15, wherein the first and the second output terminals directly provide any one of the first and the second simultaneously decoded data streams externally with respect to the receiver.

* * * * *